(12) United States Patent
Hong et al.

(10) Patent No.: US 7,085,106 B2
(45) Date of Patent: Aug. 1, 2006

(54) ACTUATOR LATCH APPARATUS FOR DATA STORAGE DEVICE

(75) Inventors: Min-pyo Hong, Suwon (KR);
Yong-kyu Byun, Yongin (KR);
Woo-sup Han, Yongin (KR);
Cheol-soon Kim, Anyang (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/331,012

(22) Filed: Jan. 13, 2006

(65) Prior Publication Data

US 2006/0114613 A1    Jun. 1, 2006

Related U.S. Application Data

(62) Division of application No. 10/444,963, filed on May 27, 2003.

(30) Foreign Application Priority Data

Jan. 21, 2003   (KR)   ...................... 10-2003-0004107

(51) Int. Cl.
*G11B 5/54*    (2006.01)
*G11B 21/22*   (2006.01)
(52) U.S. Cl. .................... 360/256; 360/256.3
(58) Field of Classification Search ............. 360/256, 360/256.1–256.6
See application file for complete search history.

(56) References Cited

U.S. PATENT DOCUMENTS 4,996,617 A * 2/1991 Yaeger et al. ............ 360/256.3

| | | |
|---|---|---|
| 5,019,932 A | 5/1991 | Iwata |
| 5,812,345 A | 9/1998 | MacPherson et al. |
| 6,008,992 A | 12/1999 | Kawakami |
| 6,163,440 A | 12/2000 | Takahashi et al. |
| 6,400,533 B1 | 6/2002 | Liu et al. |

FOREIGN PATENT DOCUMENTS

| | | |
|---|---|---|
| EP | 380256 A1 * | 8/1990 |
| JP | 60-147981 A | 8/1985 |
| JP | 60-251571 A | 12/1985 |
| JP | 2-193375 A | 7/1990 |
| JP | 4-043198 A | 2/1992 |

(Continued)

*Primary Examiner*—William J Klimowicz
(74) *Attorney, Agent, or Firm*—Buchanan Ingersoll PC

(57) ABSTRACT

An actuator latch apparatus for a data storage device includes a latch lever installed on a base plate of the data storage device capable of pivoting and having a first latch portion provided at one end portion of the latch lever, a spring connected to the other end portion of the latch lever and made of a shape memory alloy to allow the latch lever to pivot in a predetermined direction by being deformed according to application of electric power, and a second latch portion provided at an end portion of an actuator moving a read/write head to a predetermined position of a disk. When the rotation of the disk is stopped and the actuator is parked at a parking position, the spring allows the latch lever to pivot in one direction so that the first latch portion interferes with the second latch portion, thus locking the actuator not to rotate, and when the disk rotates, the spring allows the latch lever to pivot in the opposite direction so that the first latch portion is separated from the second latch portion, thus allowing the actuator to rotate. Thus, a reliable operation of the actuator latch apparatus is available due to the characteristic of the shape memory alloy and the structure of the actuator latch apparatus is simplified.

8 Claims, 12 Drawing Sheets

FOREIGN PATENT DOCUMENTS

JP 4-146580 A 5/1992
KR 1997-0067277 10/1997

* cited by examiner

ACTUATOR LATCH APPARATUS FOR DATA STORAGE DEVICE

BACKGROUND OF THE INVENTION

This application claims the priority of Korean Patent Application No. 2003-4107 filed on Jan. 21, 2003 in the Korean Intellectual Property Office, the disclosure of which is incorporated herein in its entirety by reference.

1. Field of the Invention

The present invention relates to a data storage device such as a hard disk drive, and more particularly, to an actuator latch apparatus for a data storage device which can prevent an actuator from being rotated by an external impact by locking the actuator at a predetermined position when the rotation of a disk is stopped.

2. Description of the Related Art

A hard disk drive (HDD) which is one of data storage devices for a computer reproduces data from a disk or records data on the disk by using a read/write head. In the hard disk drive, the head is moved to a desired position by the actuator in a state of being raised from a recording surface of the rotating disk to a predetermined height, thus performing its functions.

When the hard disk drive is not operated, that is, the rotation of the disk is stopped, to prevent the head from colliding against the recording surface of the disk, the head is parked at a position out of the recording surface of the disk. The head parking system can be classified into a CSS (contact start stop) system and a ramp loading system. The CSS system is to form a landing zone at an inner circumferential side of the disk, where data is not recorded, and park the head so as to contact the landing zone. According to the ramp loading system, a ramp is installed at an outer side of the disk and the head is parked on the ramp.

However, in a state in which the head is parked in the landing zone of a disk or on the ramp, when an external impact or vibration is applied to the disk drive, the actuator is arbitrarily rotated so as to escape from the landing zone or ramp and move toward the recording surface of the disk. In this case, the head contacts the recording surface of the disk so that the head and/or the recording surface of the disk may be damaged. Thus, when the rotation of the disk is stopped and the head is parked in the landing zone or on the ramp, the actuator needs to be locked at a predetermined position not to be rotated arbitrarily. For this purpose, a variety of actuator latch apparatuses are provided.

In the CSS system, a magnet latch apparatus is typically used. The magnet latch apparatus locks an actuator at a desired position, that is, at a parking position, using a magnetic force of a permanent magnet. In the magnet latch apparatus, a strong magnetic force is required to obtain a stronger latch force in order to stably lock the actuator. However, to operate the disk drive, the head needs to be moved toward the recording surface of the disk. For this purpose, the locking state of the actuator must be removed. Here, since torque applied to the actuator increases as the latch force increases, as soon as the locking state is removed, the actuator rotates excessively by inertia and vibrates severely. To prevent the excessive rotation, a braking force needs to be applied to the rotating actuator at the same time when the locking state of the actuator is removed. Such accurate control of the actuator is very difficult. Thus, there is a limit to the latch force in the conventional magnet latch apparatus and accordingly it is difficult to appropriately to react to a strong external impact.

To solve the above problems, a dual latch apparatus using an inertial latch and a magnet latch has been suggested, an example of which is shown in FIG. 1. A dual latch apparatus shown in FIG. 1 is applied to a hard disk drive having a head parking system in a CSS system and is disclosed in U.S. Pat. No. 6,400,533.

Referring to FIG. 1, a disk drive 10 has a disk 12, or a plurality of disks, installed at a spindle motor 14. An actuator 18 moves a read/write head 16 to a desired position on the disk 12 and is rotatably installed on a base plate 20. A landing zone 28 where the head 16 is parked and no data is recorded is provided in an inner circumferential side of the disk 12. A data zone 30 where data is recorded is provided outside the landing zone 28. As shown in the drawing, a magnet latch apparatus 44 and an inertial latch apparatus 60 to lock the actuator 18 when the head 16 is parked in the landing zone 28 are provided in the disk drive.

The magnet latch apparatus 44 to react to a relatively weak impact or vibration includes a magnet 40 and a metal stopper 42. The inertial latch apparatus 60 to react to a relatively strong impact includes a first latch member 62 installed on a base plate 20 capable of pivoting and a second latch member 64 provided at an end portion of an actuator arm 24. When a strong rotational shock is applied to the disk drive 10, the first latch member 62 pivots by inertia to interfere with the second latch member 64 so that the actuator 18 is prevented from being rotated arbitrarily, However, it is difficult to apply the conventional inertial latch apparatus 60 having the above structure to a compact mobile disk drive due to its large size occupying a large space. Also, since the inertial latch apparatus 60 can react to a relatively strong rotational impact only, to react to a relatively weak impact and vibration, the magnet latch apparatus 44 is additionally needed. Thus, the entire structure of the disk drive 10 is complicated and the cost for assembly and the time therefor increase.

In the meantime, U.S. Pat. No. 6,163,440 discloses an inertial latch apparatus adopted to a ramp loading type disk drive. Since the inertial latch apparatus is made up of numerous parts such as an inertial lever and a latch lever, the structure thereof is complex and a large space is required. Also, since the inertial latch apparatus can react to a relatively strong rotational impact as described above, a magnet latch apparatus is needed as an additional latch apparatus to react to a relatively weak impact and vibration.

FIG. 2 illustrates an active latch apparatus using an electromagnet disclosed in U.S. Pat. No. 5,812,345.

Referring to FIG. 2, a disk drive 70 includes an actuator 72 installed in a housing 78. The actuator 72 moves a read/write head to a predetermined position of a disk. A coil 76 of a voice motor (not shown) is installed at one end portion of the actuator 72. An active latch apparatus 80 has a latch arm 82 installed at a frame 90. The latch arm 82 is installed capable of pivoting around a pivot pin 94 in a direction perpendicular to a direction in which the actuator 72 rotates. A permanent magnet 92 is installed at one end portion of the latch arm 82 and a latch member 88 is provided at the other end portion thereof. The active latch apparatus 80 has an electromagnet 96 which is separated a predetermined distance from the permanent magnet 92.

When the actuator 72 is parked in the landing zone of a disk, the latch arm 82 pivots in a predetermined direction by a magnetic force of the permanent magnet 92. Accordingly, the latch member 88 of the latch arm 82 is hooked by a latch tab 84 provided at one end portion of the actuator 72 so that the actuator 72 is locked not to be arbitrarily rotated. When an electric power is applied to the electromagnet 96, the latch arm 82 rotates in the opposite direction so that the actuator 72 is unlocked and can rotate.

However, the active latch apparatus 80 having the above conventional structure needs the permanent magnet 92 and the electromagnet 96 to operate the latch arm 82. Accordingly, an additional electric power and on/off control thereof for the operation of the electromagnet 96 are required. Furthermore, since the active latch apparatus 80 has a complex structure and occupies a large space due to its large size, it is difficult to apply the active latch apparatus 80 to a compact mobile disk drive.

SUMMARY OF THE INVENTION

To solve the above and/or other problems, the present invention provides an actuator latch apparatus for a data storage device having a spring or a latch lever made of a shape memory alloy so that the structure thereof is simplified and the operation thereof is reliable due to the characteristic of the shape memory alloy.

According to an aspect of the present invention, an actuator latch apparatus for a data storage device comprising a latch lever installed on a base plate of the data storage device capable of pivoting and having a first latch portion provided at one end portion of the latch lever, a spring connected to the other end portion of the latch lever and made of a shape memory alloy to allow the latch lever to pivot in a predetermined direction by being deformed according to application of electric power, and a second latch portion provided at an end portion of an actuator moving a read/write head to a predetermined position of a disk, wherein, when the rotation of the disk is stopped and the actuator is parked at a parking position, the spring allows the latch lever to pivot in one direction so that the first latch portion interferes with the second latch portion, thus locking the actuator not to rotate, and when the disk rotates, the spring allows the latch lever to pivot in the opposite direction so that the first latch portion is separated from the second latch portion, thus allowing the actuator to rotate.

The shape memory alloy spring is a coil spring, and the shape memory alloy spring is a zigzag spring.

The shape memory alloy spring allows the latch lever to pivot in a predetermined direction as the length of the shape memory alloy spring is extended or compressed according to the application of electric power.

When the electric power is not applied to the shape memory alloy spring, the length of the shape memory alloy spring is extended so that the latch lever pivots in one direction, and when the electric power is applied to the shape memory alloy spring, the temperature of the shape memory alloy spring rises so that the length of the shape memory alloy spring decreases and the shape memory alloy spring allows the latch lever to pivot in the opposite direction.

The actuator latch apparatus further comprises a latch stopper installed close to the latch lever to restrict pivot of the latch lever in one direction.

According to another aspect of the present invention, an actuator latch apparatus for a data storage device comprises a latch lever having a first latch portion at one end portion of the latch lever and having the other end portion fixed to a base plate of the data storage device, and made of a shape memory alloy capable of being deformed according to application of electric power, and a second latch portion provided at an end portion of an actuator moving a read/write head to a predetermined position of a disk, wherein, when the rotation of the disk is stopped and the actuator is parked at a parking position, the first latch portion of the latch lever interferes with the second latch portion, thus locking the actuator not to rotate, and when the disk rotates, the latch lever is deformed so that the first latch portion is separated from the second latch portion, thus allowing the actuator to rotate.

When the electric power is not applied to the shape memory alloy latch lever, the shape memory alloy latch lever is straightened, and when the electric power is applied to the shape memory alloy latch lever, the temperature of the shape memory alloy latch lever rises so as to be bent.

The shape memory alloy spring is made of a Ni—Ti alloy.

The shape memory alloy spring remembers a first shape in a room temperature and a second shape substantially at a temperature over 80° C.

Wires to apply the electric power are connected to both end portions of the shape memory alloy spring, and the wires are flexible printed circuits.

The first latch portion is a hook and the second latch portion is a protrusion, and at least one of contact surfaces of the hook and the protrusion is formed inclined.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
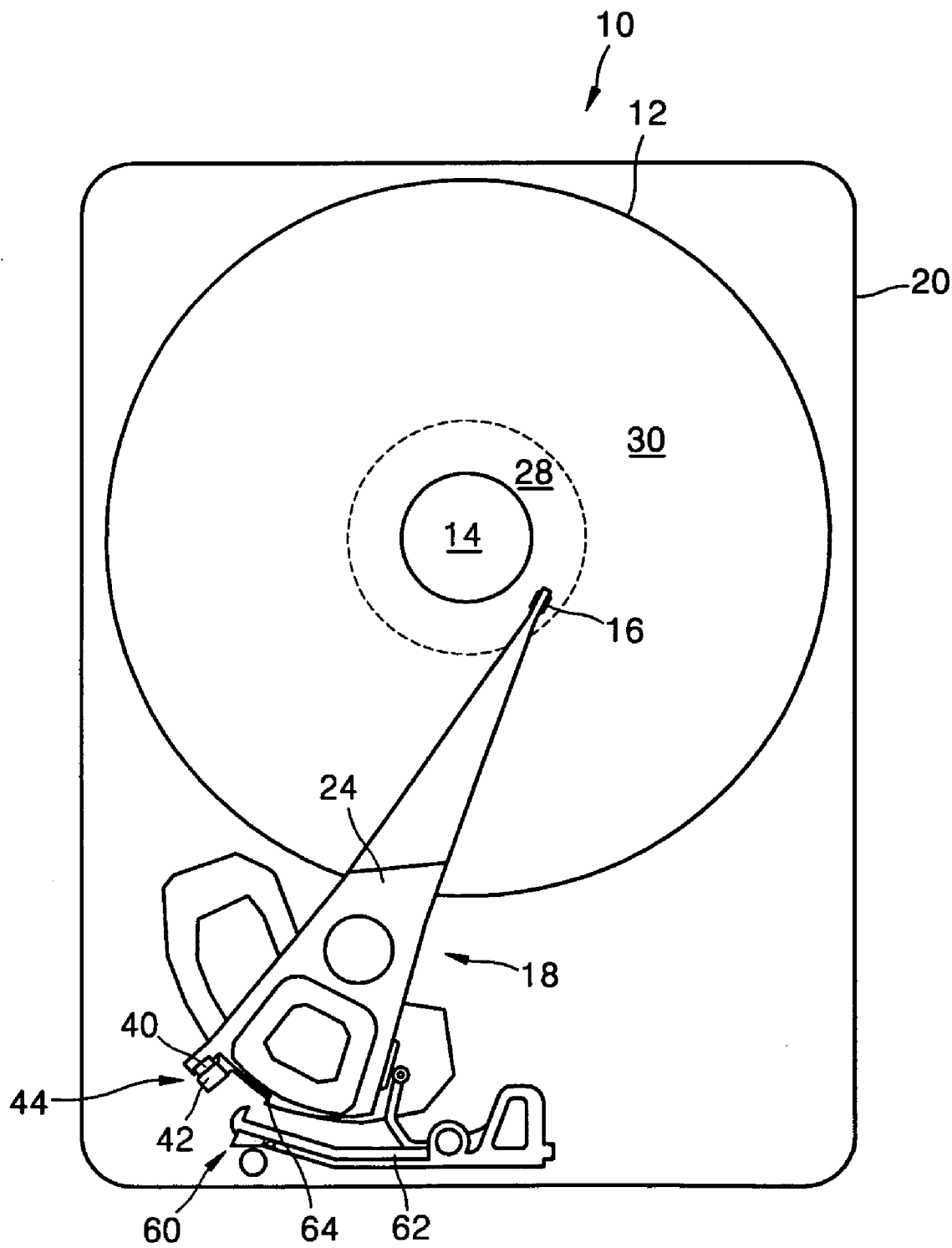
FIG. 1 is a plan view illustrating an example of a conventional actuator latch apparatus.
Figure 2:
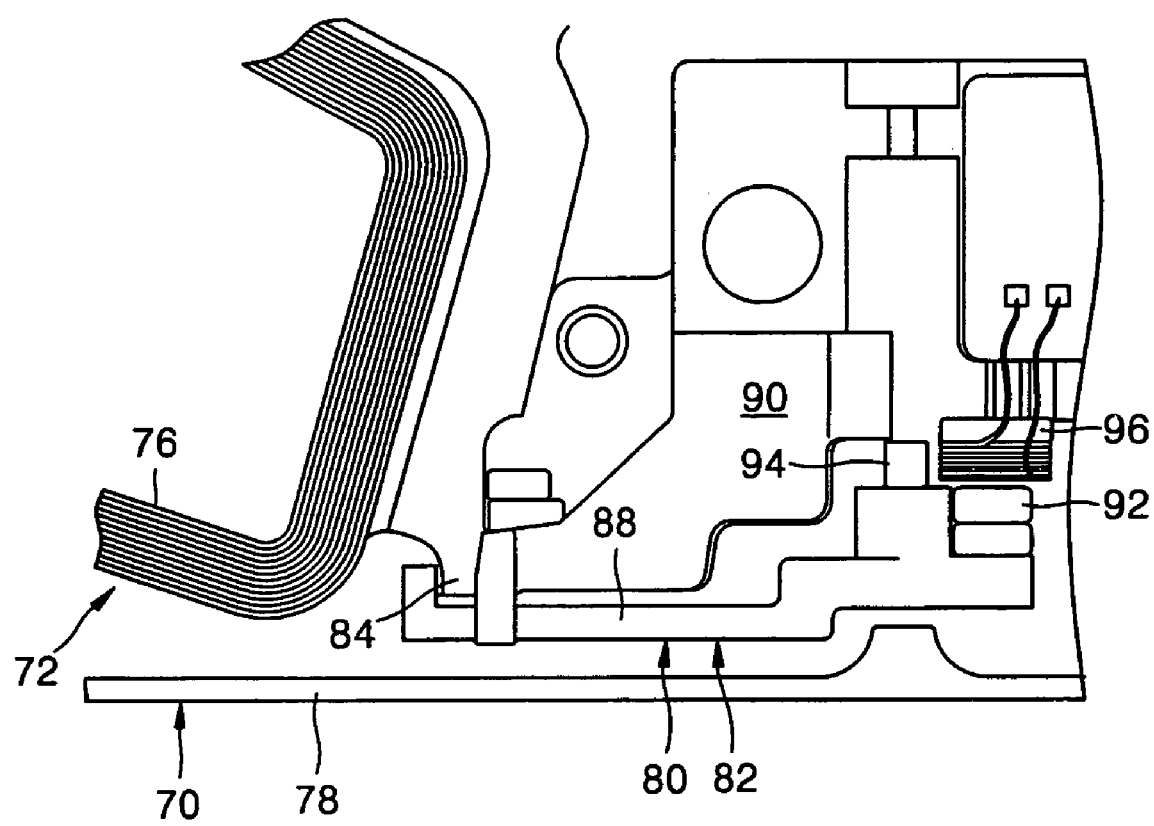
FIG. 2 is a plan view illustrating another example of the conventional actuator latch apparatus.
Figure 3:
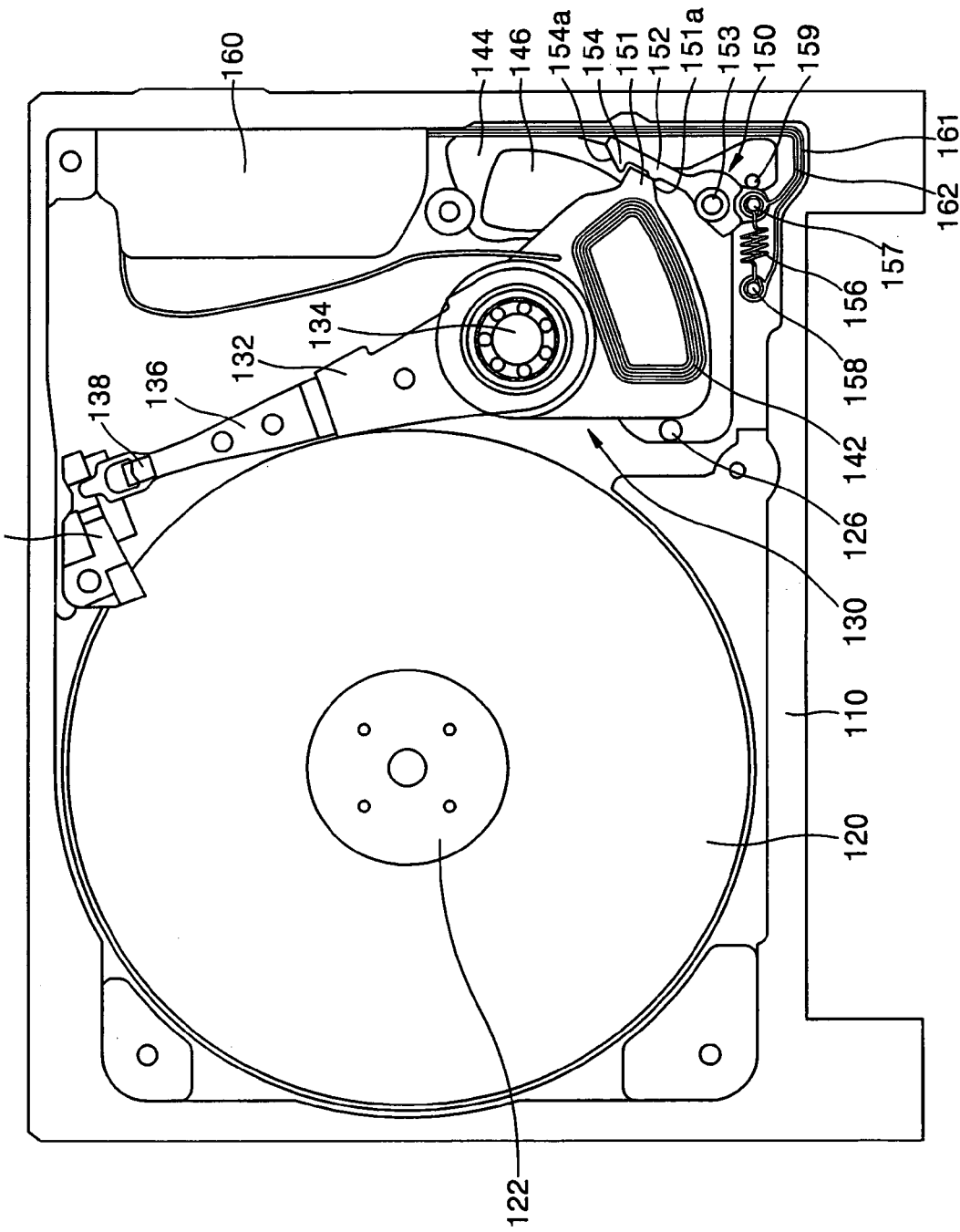
FIG. 3 is a plan view illustrating a hard disk drive adopting an actuator latch apparatus according to a first preferred embodiment of the present invention.
Figure 4:
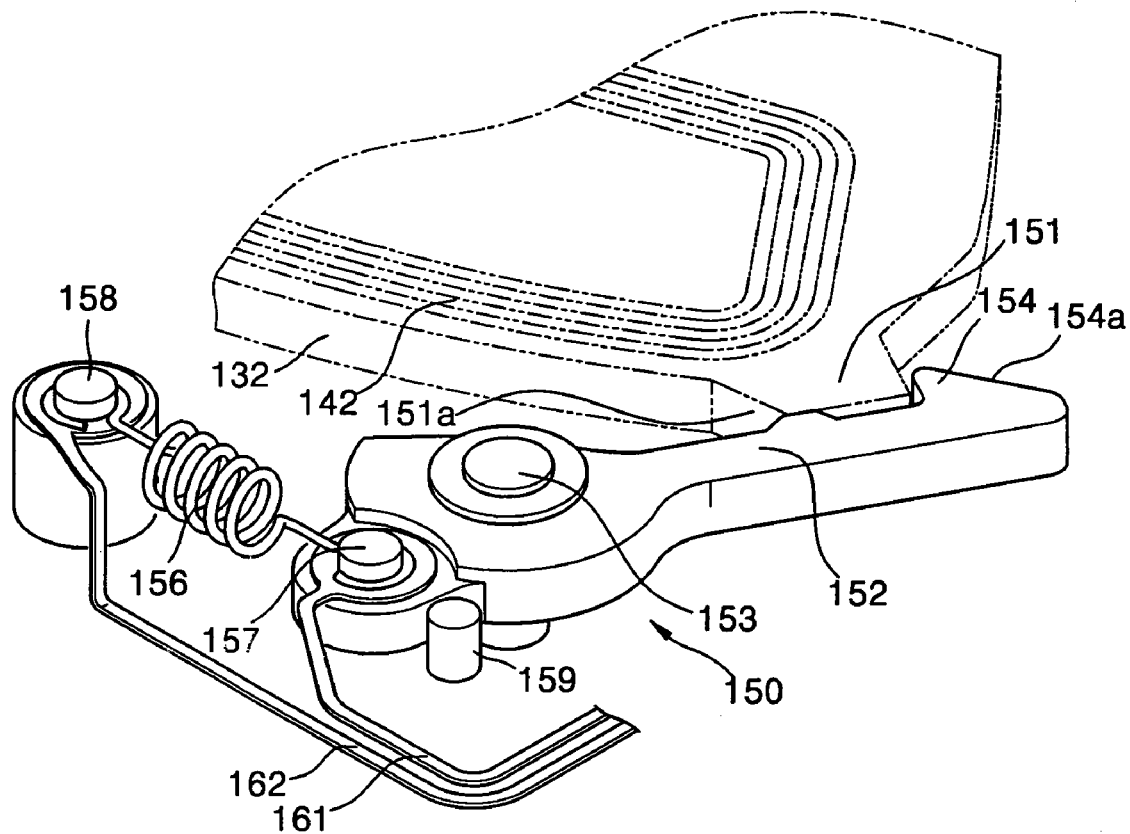
FIG. 4 is a perspective view illustrating the actuator latch apparatus of FIG. 3.

Referring to FIGS. 3 and 4, a hard disk drive includes a disk 120 installed on a spindle motor 122 and an actuator 130 to move a read/write head 138 for recording and reproducing data to a predetermined position of the disk 120. The actuator 130 includes an actuator arm 132 rotatably coupled to an actuator pivot 134 installed on a base plate 110 of the hard disk drive and a suspension 136 installed at one end portion of the actuator arm 132 to support the rear/write head 138 elastically biased toward a surface of the disk 120.

A voice coil motor (VCM) (not referenced) for rotating the actuator 130 is installed in the hard disk drive. The VCM includes a VCM coil 142 coupled to the other end portion of the actuator arm 132, a lower yoke 144 installed under the VCM coil 142, and a magnet 146 attached on an upper surface of the lower yoke 144. Although not shown in the drawing, the VCM may include an upper yoke installed above the VCM coil 142 and a magnet attached on a lower surface of the upper yoke.

The VCM having the above structure is controlled by a servo control system rotates the actuator 130 in a direction following the Fleming's left hand rule by the interaction between current input to the VCM coil 142 and a magnetic field generated by the magnet 146. That is, when electric power of the hard disk drive is turned on so that the disk 120 begins to rotate, the VCM rotates the actuator 130 counter-clockwise to move the read/write head 138 above a recording surface of the disk 120. When the electric power of the hard disk drive is turned off so that the rotation of the disk 120 is stopped, the VCM rotates the actuator 130 clockwise so that the read/write head 138 is parked on a ramp 124 installed at the outer side of the disk 120.

An actuator latch apparatus 150 according to a preferred embodiment of the present invention is provided in the hard disk drive. The actuator latch apparatus 150 locks the actuator 130 to maintain the state of the read/write head 138 being parked on the ramp 124 when the operation of the hard disk drive is stopped, that is, the rotation of the disk 120 is stopped. In other words, the actuator latch apparatus 150 prevents the actuator 130 from being unnecessarily rotated due to an external impact or vibration and moved above the disk 120, escaping from the ramp 124, when the rotation of the disk 120 is stopped. When the read/write head 138 moves above the disk 120 in the state in which the rotation of the disk 120 is stopped, the read/write head 138 directly contacts the surface of the disk 120 so that the surface of the disk 120 and the read/write head 138 may be damaged.

The actuator latch apparatus 150 includes a latch lever 152 installed on the base plate 110 capable of pivoting and having a hook 154 provided at one end portion thereof, a spring 156 connected to the other end portion of the latch lever 152 to allow the latch lever 152 to pivot in a predetermined direction, and a protrusion 151 provided at the end portion of the actuator 130.

The latch lever 152 is coupled to a latch pivot 153 installed on the base plate 110 capable of pivoting. The hook 154 as a first latch portion is provided at one end portion of the latch lever 152 and a first pin 157 is provided at the other end portion thereof. One end portion of the spring 156 is coupled to the first pin 157.

The spring 156 has the one end portion coupled to the first pin 157 and the other end portion coupled to a second pin 158 fixedly installed on the base plate 110. The spring 156 is made of a shape memory alloy (SMA). The SMA is an alloy exhibiting a feature of, after being deformed by a plastic process, recovering its original shape prior to the plastic process by a heat treatment. That is, the SMA is an alloy remembering its original shape before a plastic process. For this alloy, there is a Cu based SMA such as a Cu—Zn—Ni alloy and a Cu—Al—Ni alloy and a Fe based SMA alloy such as a Fe—Mn—Si—Cr—Ni alloy, as well as a Ag—Ni alloy, a Au—Cd alloy, and a Ni—Ti alloy. The SMA spring 156 can be manufactured of any of the above SMAs, preferably, a Ni—Ti alloy exhibiting a superior memory feature. Although it is preferable that the SMA spring 156 is a coil spring as shown in the drawing, different sorts of springs can be used therefor.

The SMA spring 156 can be deformed according to the application of electric power. That is, the SMA spring 156 can be extended or compressed according to the application of electric power and accordingly the latch lever 152 pivots in a predetermined direction. In detail, when electric power is not applied to the SMA spring 156, since the SMA spring 156 is in a state of being extended, the latch lever 152 is maintained in a state of being rotated in one direction. When the electric power is applied to the SMA spring 156, the temperature of the SMA spring 156 rises so that the length thereof decreases to allow the latch lever 152 to pivot in the opposite direction.

The SMA spring 156 remembers a first shape, that is, an extended shape, when the electric power is not applied, that is, in the room temperature, and a second shape, that is, a compressed shape, when the electric power is applied so that the temperature of the SMA spring 156 is over a predetermined temperature. The predetermined temperature at which the SMA spring 156 is deformed to the second shape may be over 80° C. However, the temperature can be changed according to the composition of an alloy of the SMA spring 156.

To control the temperature of the SMA spring 156, wires to apply the electric power are connected to both end portions of the SMA spring 156. since the position of one end portion of the SMA spring 156 changes, the wires may be flexible printed circuits 161 and 162. The flexible printed circuits 161 and 162 are extended from a printed circuit board 160 and connected to the first pin 157 and the second pin 158, respectively, so that the flexible printed circuits 161 and 162 are connected to both end portions of the SMA spring 156.

The protrusion 151 as a second latch portion which is restricted by the hook 154 of the latch lever 152 horizontally protrudes from an end portion of the actuator 130 toward the latch lever 152. At least one of contact surfaces 154a and 151a of the hook 154 and the protrusion 151 can be formed inclined. Preferably, both of the contact surfaces 154a and 151a are formed as inclined surfaces as shown in the drawing, which will be described later.

The actuator latch apparatus 150 according to a first preferred embodiment of the present invention can include a latch stopper 159 installed close to the latch lever 152 to restrict the pivot of the latch lever 152 in one direction, that is, a counterclockwise direction. The angle of the pivot of the latch lever 152 in the counterclockwise direction can be limited by the length of the extension of the SMA spring 156. However, the latch stopper 159 can more accurately restrict the counterclockwise pivot angle of the latch lever 152. In addition, an actuator stopper 126 is provided to restrict the clockwise rotation of the actuator 130.

Figure 5:
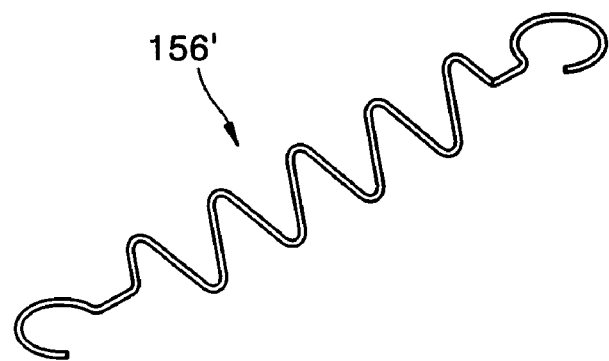
FIG. 5 is a perspective view illustrating another example of the SMA spring of FIG. 4.

FIG. 5 shows another example of the SMA spring 156 shown in FIG. 4. Referring to FIG. 5, an SMA spring 156' having a zigzag shape may be used instead of the SMA spring 156 of FIG. 4 having a coil shape. While a coil spring exhibits a large deformation amount and a small operational force according to the deformation, a zigzag spring exhibits a small deformation amount and a great operational force according to the deformation. Thus, the coil SMA spring 156 or the zigzag SMA spring 156' is selected considering an installation space of the SMA spring and a pivot range of the latch lever 152 of FIG. 4.

The operation of the actuator latch apparatus according to the first referred embodiment of the present invention having the above structure will be described below with reference to FIGS. 3 and 6A through 6C.

As shown in FIG. 3, when the rotation of the disk 120 is stopped so that the actuator 130 is parked at the parking position, that is, the head 138 is accommodated on the ramp 124, the electric power is not applied to the SMA spring 156. Thus, since the SMA spring 156 is in an extended state and the latch lever 152 is rotated counterclockwise, the hook 154 of the latch lever 152 interferes with the protrusion 151 of the actuator 130 so that the actuator 130 is prevented from being rotated toward the disk 120 by an external impact or vibration.

Figure 6A:
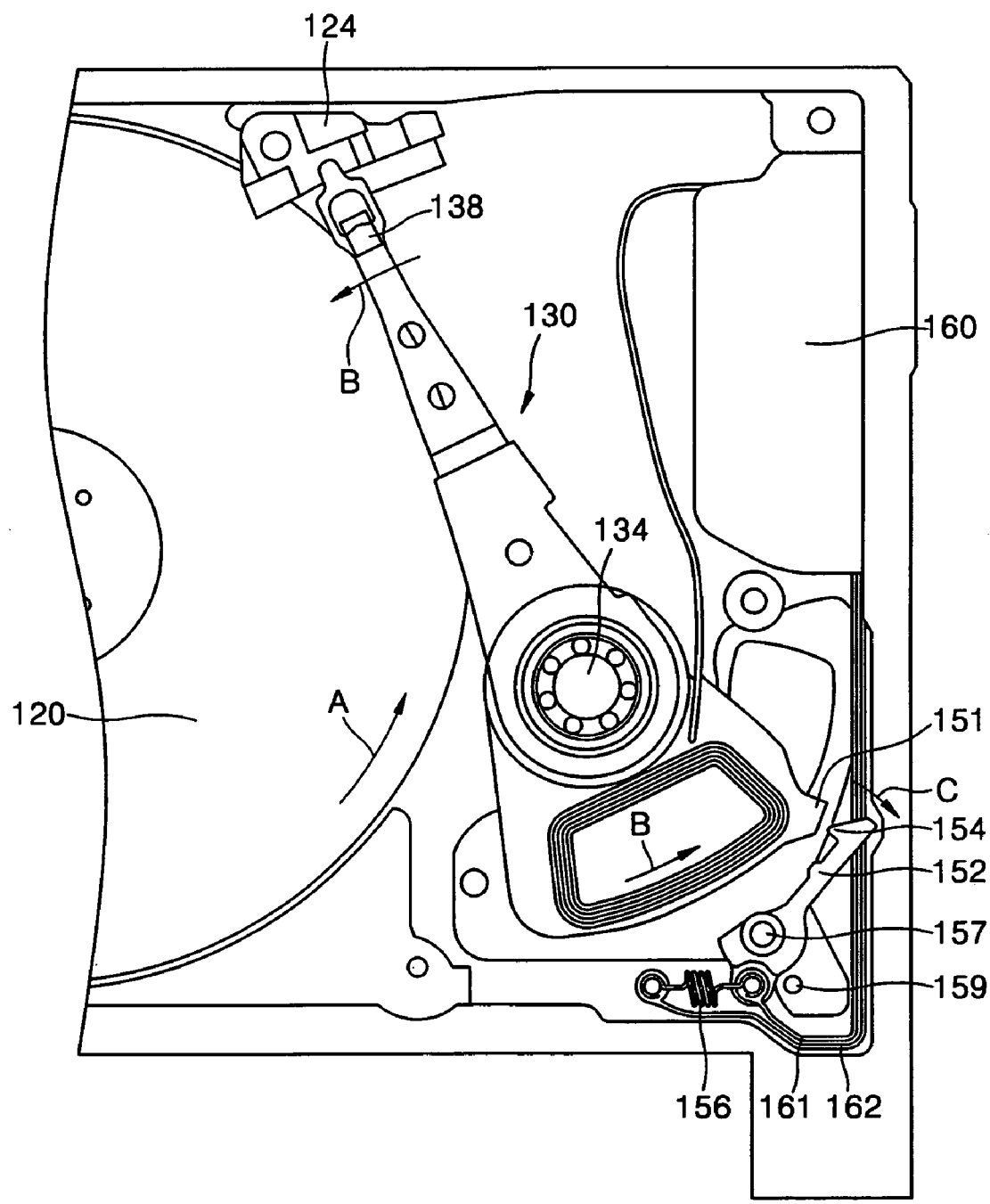
FIGS. 6A through 6C are views depicting the operation of the latch apparatus of FIG. 3.

Next, referring to FIG. 6A, when the disk 120 begins to rotate in a direction indicated by an arrow A, the electric power is applied to the SMA spring 156 through the printed circuits 161 and 162 so that the temperature of the SMA spring 156 rises. When the temperature of the SMA spring 156 is over a predetermined temperature, for example, 80° C., the SMA spring 156 is compressed and the latch lever 152 pivots clockwise around the latch pivot 157, that is, in a direction indicated by an arrow C. Accordingly, the hook 154 of the latch lever 152 is separated from the protrusion 151 of the actuator 130. Then, the actuator 130 can rotate counterclockwise around the actuator pivot 134, that is, in a direction indicated by an arrow B. Consequently, the head 138 moves above the disk 120.

Figure 6B:
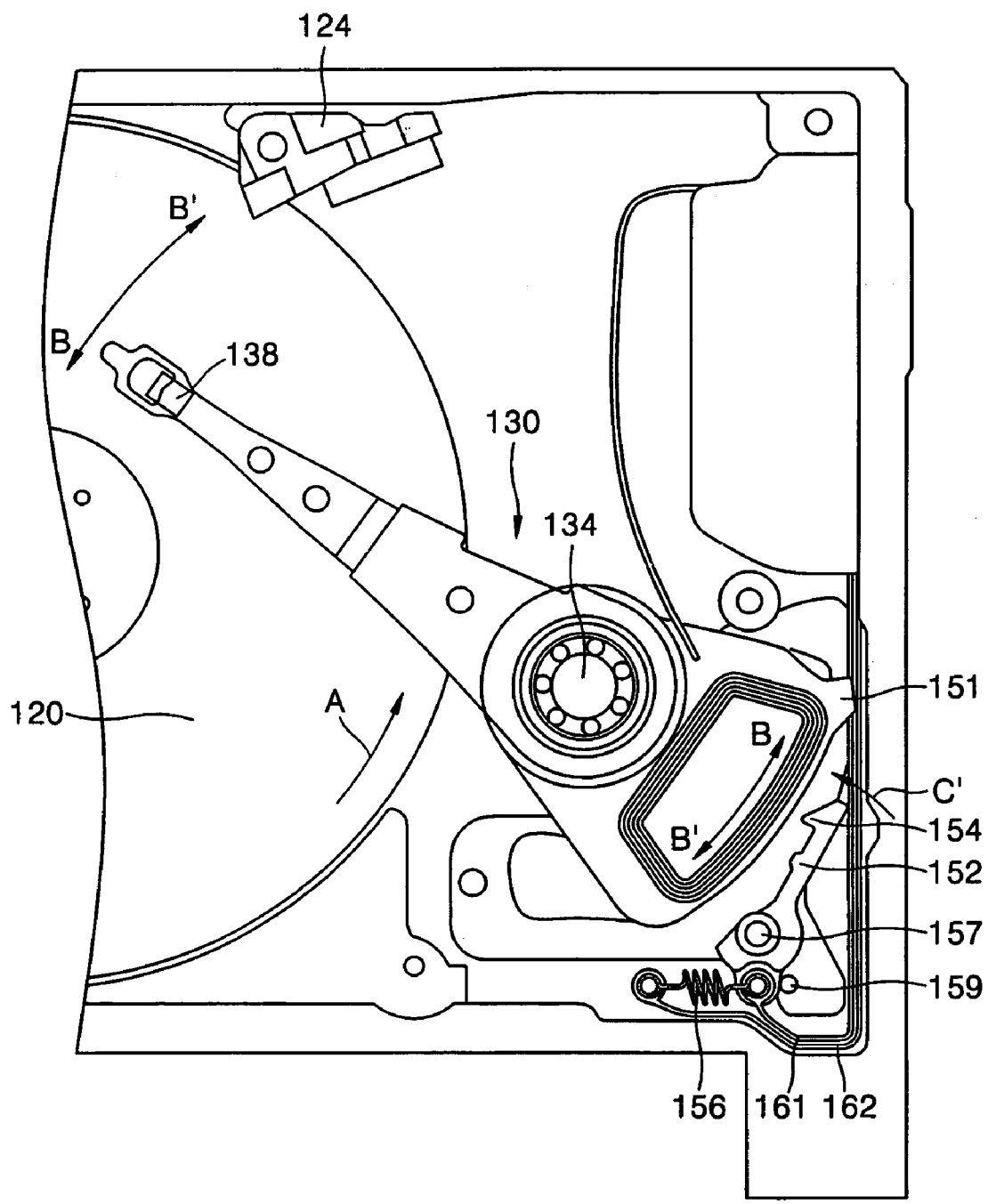

Referring to FIG. 6B, when the protrusion 151 of the actuator 130 is completely separated from the hook 154 of the latch lever 152, the electric power applied to the SMA spring 156 is cut off. Accordingly, the temperature of the SMA spring 156 falls so that the SMA spring 156 is extended. Then, the latch lever 152 pivots counterclockwise, that is, in a direction indicated by an arrow C'. The counterclockwise pivot angle of the latch lever 152 is restricted by the latch stopper 159 so that the latch lever 152 is prevented from contacting the end portion of the actuator 130. In this state, the actuator 130 rotates counterclockwise, that is, in a direction indicated by an arrow B, or clockwise, that is, in a direction indicated by an arrow B') to move the head 138 to a desired position on the disk 120.

Figure 6C:
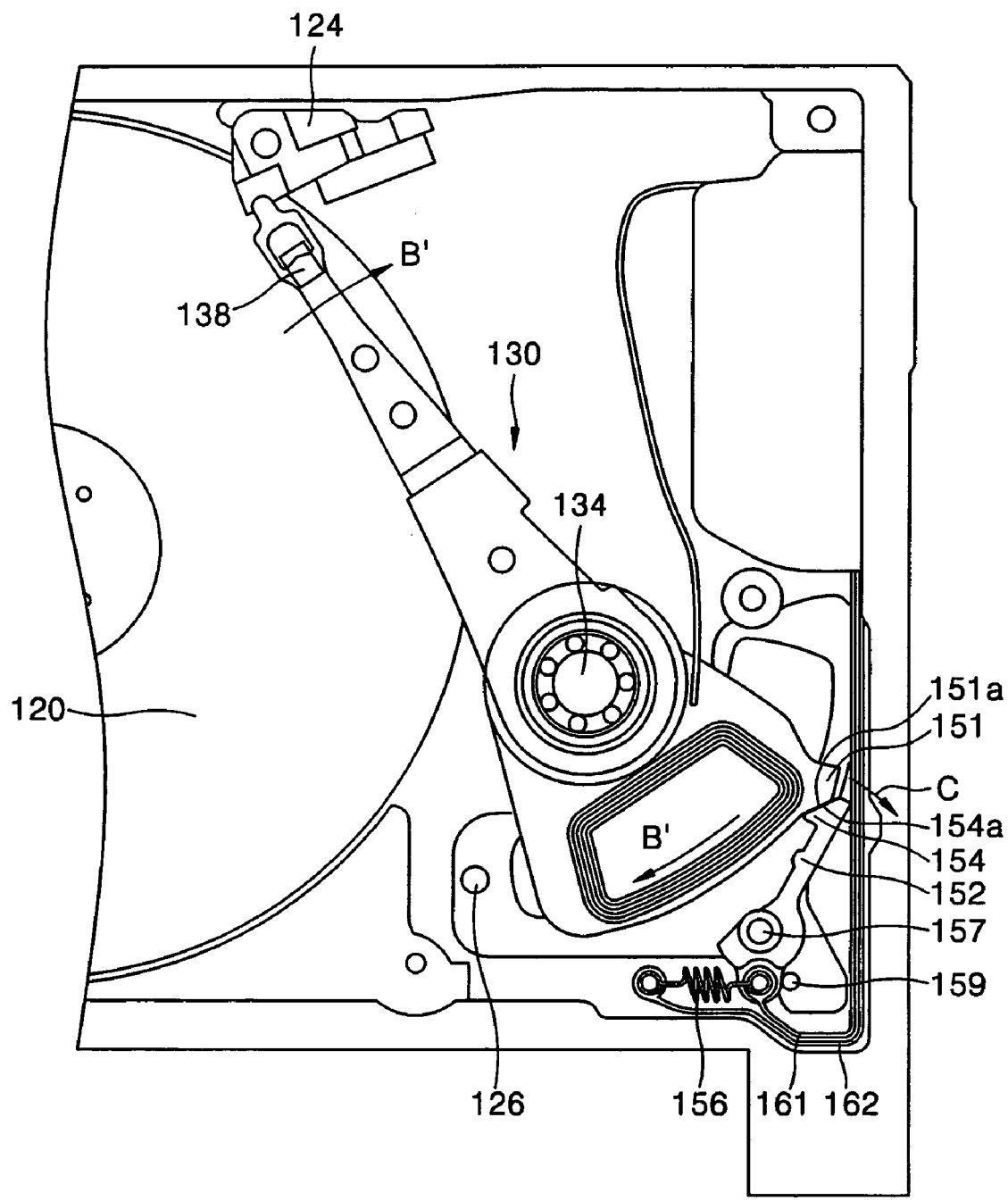

Referring to FIG. 6C, when the operation of the hard disk drive is completed and the rotation of the disk 120 is stopped, the actuator 130 is rotated clockwise, that is, in the direction B' to park the head 138 on the ramp 124. The protrusion 151 of the actuator 130 pushes the hook 154 of the latch lever 152 to make the latch lever 152 slightly pivot clockwise, that is, in the direction C. Accordingly, the SMA spring 156 is slightly compressed. Since the contact surfaces 154a and 151a of the hook 154 and the protrusion 151 are inclined, the contact surface 151a of the protrusion 151 contacts the contact surface 154a of the hook 154 and slides thereon. Thus, the actuator 130 can be easily rotated to the parking position.

When the actuator 130 is completely rotated to the parking position and the side surface of the actuator 130 contacts the actuator stopper 126, the hook 154 pivots to its original position. Accordingly, as shown in FIG. 3, the protrusion 151 is hooked by the hook 154 so that an arbitrary rotation of the actuator 130 is prevented.

Figure 7:
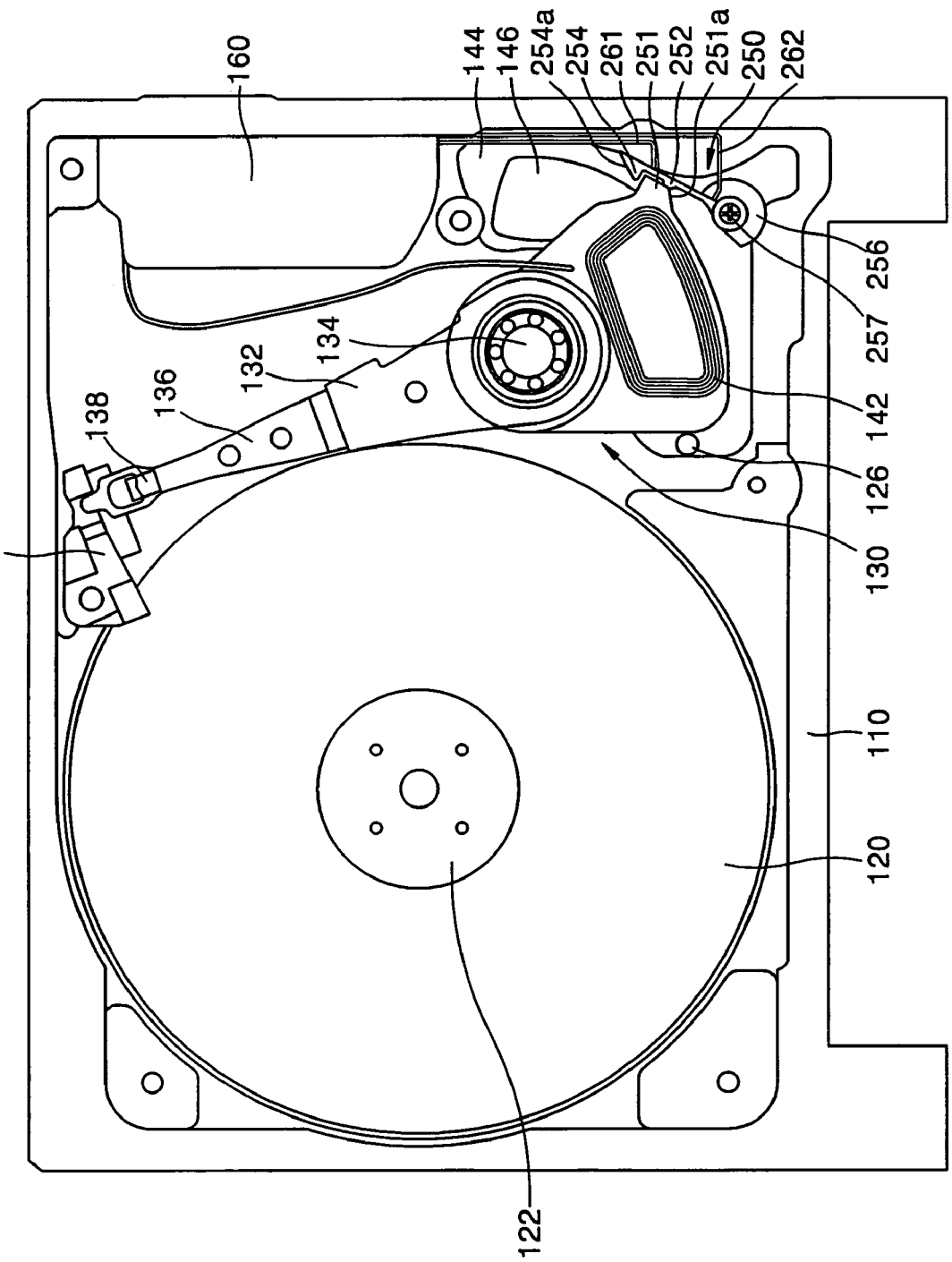
FIG. 7 is a plan view illustrating a hard disk drive having an actuator latch apparatus according to a second preferred embodiment of the present invention.
Figure 8:
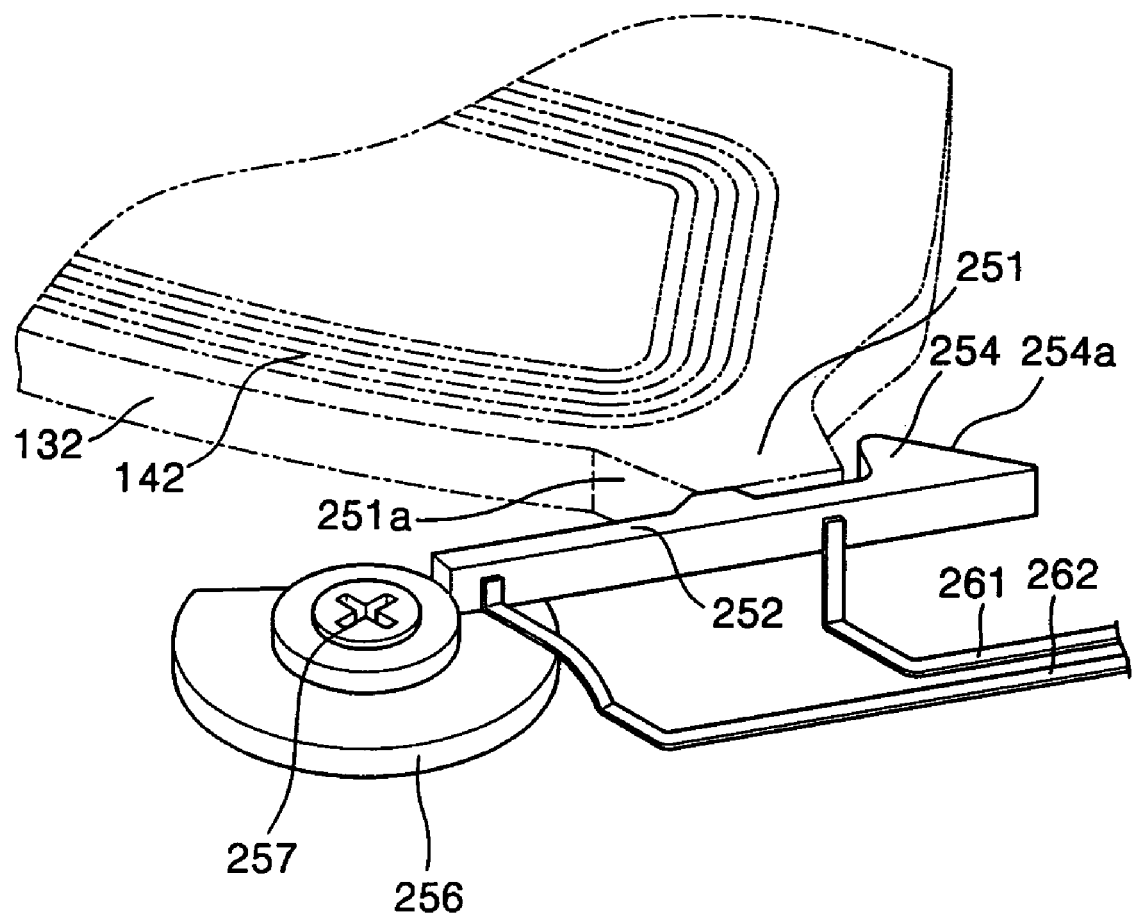
FIG. 8 is a perspective view illustrating the actuator latch apparatus of FIG. 7.

FIG. 7 is a plan view illustrating a hard disk drive having an actuator latch apparatus according to a second preferred embodiment of the present invention. FIG. 8 is a perspective view illustrating the actuator latch apparatus of FIG. 7. In FIGS. 7 and 8, the same reference numerals as those of FIG. 3 indicate the same constituent elements so that detailed descriptions thereof will be omitted.

Referring to FIGS. 7 and 8, an actuator latch apparatus 250 according to a second preferred embodiment of the present invention includes a latch lever 252 having one end portion at which a hook 254 provided and the other end portion fixed to the base plate 110, and a protrusion 251 provided at the end portion of the actuator 130.

The hook 254 as a first latch portion is provided at one end portion of the latch lever 252 and the other end of the latch lever 252 is fixed to a boss 256 installed on the base plate 110 by a fixing screw 257. Accordingly, the latch lever 252 cannot pivot, but one end portion thereof can be bent. The latch lever 252 is made of an SMA. The SMA is described in the above so that a detailed description thereof will be omitted. The latch lever 252 used in the present preferred embodiment is made of a Ni—Ti alloy exhibiting a superior memory feature.

The latch lever 252 can be deformed by being bent according to the application of electric power. That is, when the electric power is not applied to the latch lever 252, the latch lever 252 is straightened. When the electric power is applied to the latch lever 252, the temperature of the latch lever 252 rises so that the latch lever 252 is bent. The latch lever 252 remembers a first shape in the room temperature which is a straightened shape, that is, a state in which the electric power is not applied, and a second shape, that is a bent shape, when the electric power is applied so that the temperature of the latch lever 252 is over a predetermined temperature. The temperature at which the latch lever is deformed into the second shape may be over 80° C. However, the temperature can be changed according to the composition of the alloy of the latch lever 252.

To control the temperature of the latch lever 252, wires to apply the electric power are connected to both end portions of the latch lever 252. Since the latch lever 252 is bent, the wires are flexible printed circuits 261 and 262. The flexible printed circuits 261 and 262 are extended from the printed circuit board 160 and connected to both end portions of the latch lever 252.

The protrusion 251 as a second latch portion which is restricted by the hook 254 of the latch lever 252 protrudes horizontally from the end portion of the actuator 130 toward the latch lever 252. At least one of contact surfaces 254a and 251a of the hook 254 and the protrusion 251, preferably, both of the contact surfaces 254a and 251a, are formed inclined. The actuator stopper 126 for restricting the clockwise rotation of the actuator 130 is provided as in the first preferred embodiment.

Referring to FIGS. 7 and 9A through 9C, the operation of the actuator latch apparatus having the above structure according to the second preferred embodiment of the present invention will now be described.

As shown in FIG. 7, when the rotation of the disk 120 is stopped and the actuator 130 is parked at the parking position, that is, the head 138 is accommodated on the ramp 124, the electric power is not applied to the latch lever 252. Thus, the latch lever 252 is in a straightened state, the hook 254 of the latch lever 252 interferes with the protrusion 251 of the actuator 130 so that the actuator 130 is prevented from rotating toward the disk 120 by an external impact or vibration.

Figure 9A:
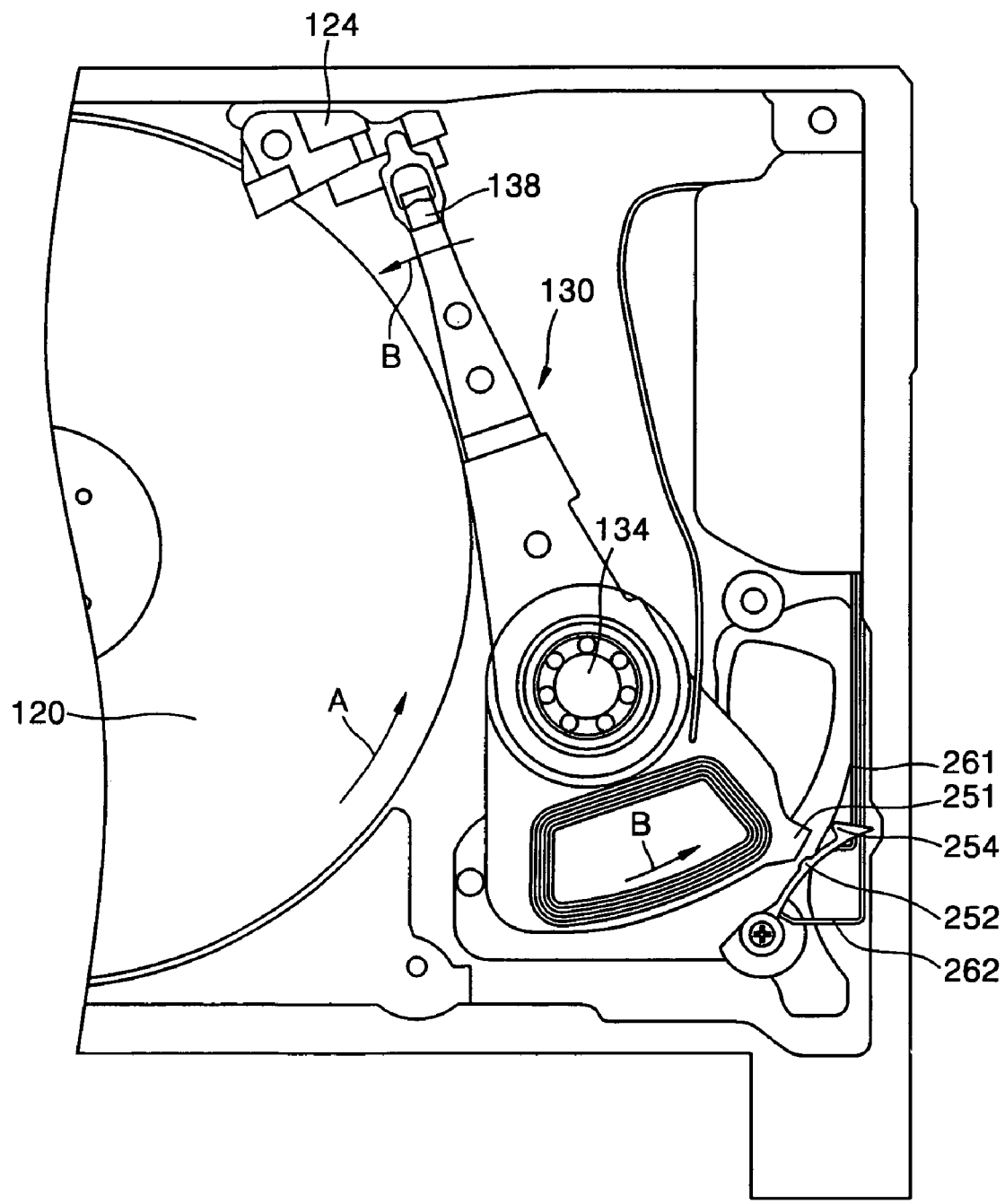
FIGS. 9A through 9C are views depicting the operation of the latch apparatus of FIG. 7.

Next, referring to FIG. 9A, when the disk 120 begins to rotate in the direction A, the electric power is applied to the latch lever 252 via the flexible printed circuits 261 and 262 so that the temperature of the latch lever 252 rises. When the temperature of the latch lever 252 is over a predetermined temperature, for example, 80° C., the latch lever 252 is bent so that the hook 254 of the latch lever 252 is separated from the protrusion 251 of the actuator 130. Thus, the actuator 130 can rotate counterclockwise in the direction B around the actuator pivot 134. Accordingly, the head 138 moves above the disk 120.

Figure 9B:
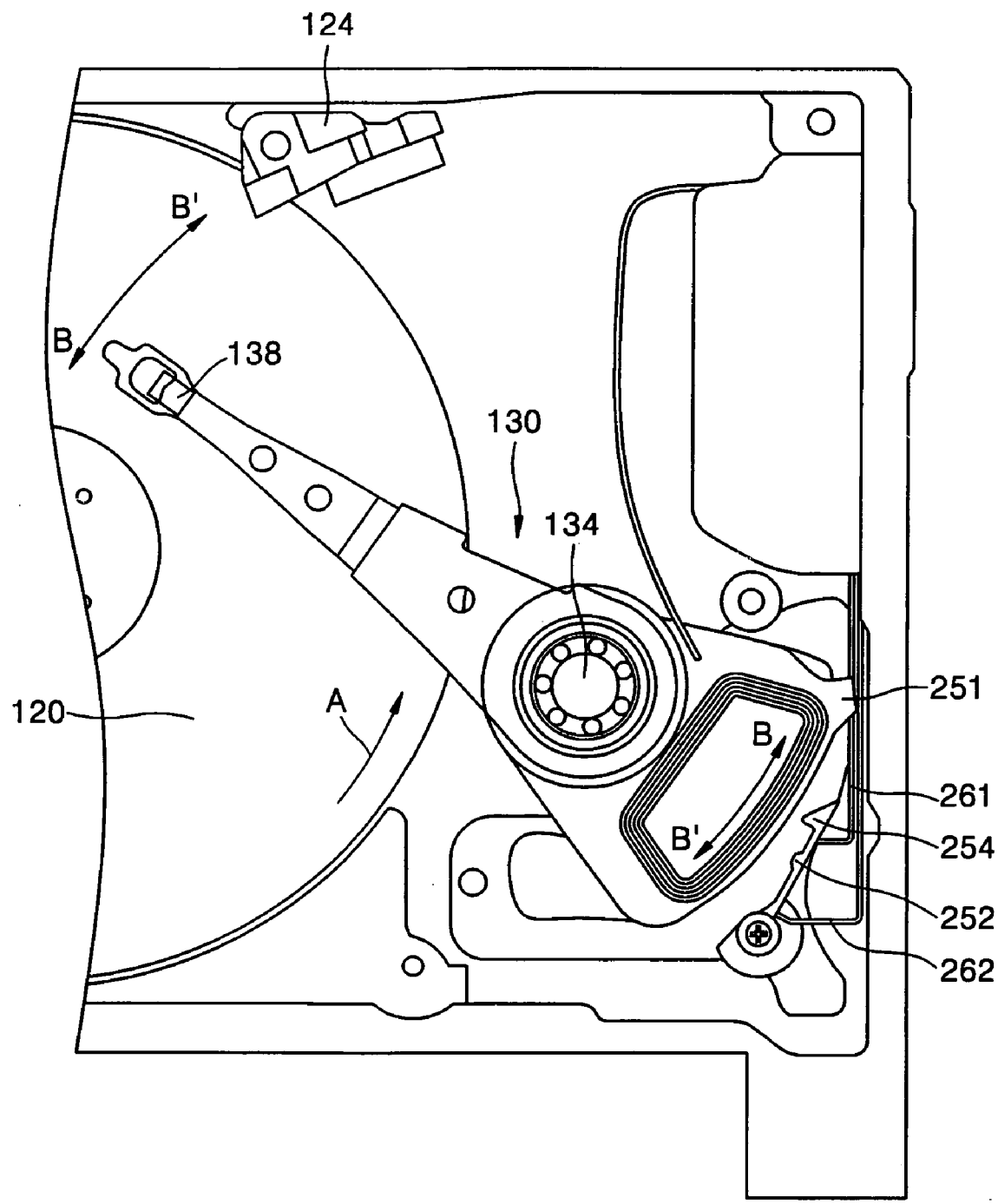

Next, referring to FIG. 9B, when the protrusion 251 of the actuator 130 is completed separated from the hook 254 of the latch lever 252, the electric power applied to the latch lever 252 is cut off. Accordingly, the temperature of the latch lever 252 falls and the latch lever 252 is straightened. In this state, the actuator 130 is rotated counterclockwise in the direction B or clockwise in the direction B' to move the head 138 to a desired position on the disk 120.

Figure 9C:
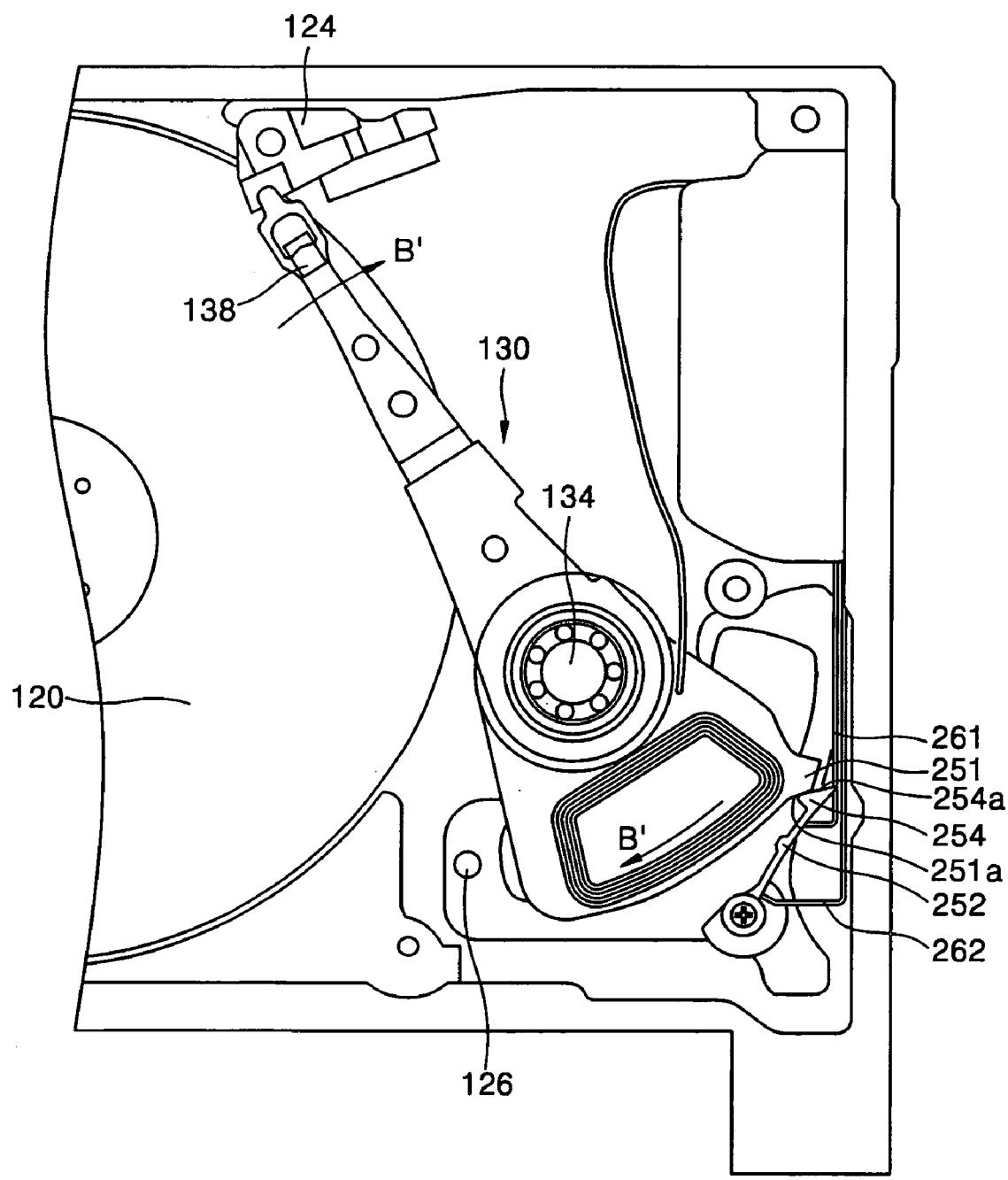

Next, referring to FIG. 9C, when the operation of the hard disk drive is completed and the rotation of the disk 120 is stopped, the actuator 130 is rotated clockwise in the direction B' to park the head 138 on the ramp 124 so that the protrusion 251 of the actuator 130 pushes the hook 254 of the latch lever 252. Accordingly, the latch lever 252 is slightly bent. Since the contact surfaces 254a and 251a of the hook 254 and the protrusion 251 are formed inclined, the contact surface 251a of the protrusion 251 contacts the contact surface 254a of the hook 254 and slides thereon. Thus, the actuator 130 can be easily rotated to the parking position.

When the actuator 130 is completely rotated to the parking position so that the side surface of the actuator 130 contacts the actuator stopper 126, the hook 254 recovers its original shape, that is, is straightened. Accordingly, as shown in FIG. 7, as the protrusion 251 is hooked by the hook 254, the arbitrary rotation of the actuator 130 is prevented.

As described above, in the actuator latch apparatus for a data storage device according to the present invention, since an active latch system using a spring or latch lever made of an SMA is adopted, it can endure a strong impact as well as a weak impact and vibration. Thus, since the actuator latch apparatus according to the present invention does not need an additional latch apparatus, the structure thereof is simplified compared to the conventional technology, a manufacturing cost is lowered, and the actuator latch apparatus can be easily adopted in a mobile disk drive.

Also, according to the actuator latch apparatus according to the present invention, a reliable operation is available due to the characteristic of the SMA so that a stable locking of the actuator is possible. Furthermore, the actuator latch apparatus according to the present invention can be applied to a data storage device having a head parking system in a CSS system and a ramp loading system.

While this invention has been particularly shown and described with reference to preferred embodiments thereof, it will be understood by those skilled in the art that various changes in form and details may be made therein without departing from the spirit and scope of the invention as defined by the appended claims. For example, although the actuator latch apparatus according to the present invention is described in the above by being applied to a disk drive having a head parking system in a ramp loading system, the present invention can be applied to a disk drive having a head parking system in a CSS system. Therefore, the technical scope of the present invention can be determined by the appended claims.

What is claimed is:

1. An actuator latch apparatus for a data storage device comprising:
   a latch lever having a first latch portion at one end portion of the latch lever and having the other end portion fixed to a base plate of the data storage device, and made of a shape memory alloy capable of being deformed according to application of electric power; and
   a second latch portion provided at an end portion of an actuator moving a read/write head to a predetermined position of a disk,
   wherein, when the rotation of the disk is stopped and the actuator is parked at a parking position, the first latch portion of the latch lever interferes with the second latch portion, thus locking the actuator not to rotate, and when the disk rotates, the latch lever is deformed so that the first latch portion is separated from the second latch portion, thus allowing the actuator to rotate.

2. The actuator latch apparatus as claimed in claim 1, wherein the shape memory alloy latch lever is made of a Ni—Ti alloy.

3. The actuator latch apparatus as claimed in claim 1, wherein the shape memory alloy latch lever remembers a first shape in a room temperature and a second shape substantially at a temperature over 80° C.

4. The actuator latch apparatus as claimed in claim 1, wherein wires to apply the electric power are connected to both end portions of the shape memory alloy latch lever.

5. The actuator latch apparatus as claimed in claim 4, wherein the wires are flexible printed circuits.

6. The actuator latch apparatus as claimed in claim 1, wherein, when the electric power is not applied to the shape memory alloy latch lever, the shape memory alloy latch lever is straightened, and when the electric power is applied to the shape memory alloy latch lever, the temperature of the shape memory alloy latch lever rises so as to be bent.

7. The actuator latch apparatus as claimed in claim 1, wherein the first latch portion is a hook and the second latch portion is a protrusion.

8. The actuator latch apparatus as claimed in claim 7, wherein at least one of contact surfaces of the hook and the protrusion is formed inclined.

* * * * *